United States Patent Office 3,221,080
Patented Nov. 30, 1965

3,221,080
POLYCARBONATE AND POLYARYLENE ETHER RESIN MIXTURES
Daniel W. Fox, Pittsfield, Mass., assignor to General Electric Company, a corporation of New York
No Drawing. Filed July 11, 1962, Ser. No. 209,248
12 Claims. (Cl. 260—860)

This invention relates to thermoplastic resin compositions and more particularly is concerned with poly-carbonate resin mixtures having increased heat distortion temperatures and an improved resistance to environmental stress crazing and cracking.

Aromatic carbonate polymers are well known, commercially available materials having a variety of applications in the plastics art. Such carbonate polymers may be prepared by reacting a dihydric phenol, such as 2,2 bis-(4-hydroxyphenyl)-propane, with a carbonate precursor such as phosgene, in the presence of an acid binding agent. Generally speaking, aromatic polycarbonate resins offer a high resistance to the attack of mineral acids, may be easily molded, and are physiologically harmless as well as stain resistant. In addition, such polymers have a high tensile and impact strength, a high heat resistance, and a dimensional stability far surpassing that of any other thermoplastic material. However, in certain applications the use of aromatic polycarbonate resins is limited since they exhibit severe environmental stress crazing and cracking. By "environmental stress crazing and cracking" I refer to the type of failure which is hastened by the presence of organic solvents such as, for example, acetone, heptane or carbon tetrachloride when such solvents are in contact with stressed parts fabricated from aromatic polycarbonate resins. Such contact may occur, for instance, when the solvents are used to clean, degrease or lubricate stressed parts fabricated from polycarbonate resins.

As known to those skilled in the art, the environmental stress crazing and cracking characteristics of polycarbonate resins have been termed their most serious deficiency, and a variety of methods have been proposed in an effort to reduce the propensity of stressed polycarbonate parts to craze and crack while in contact with organic solvents such as those mentioned above. To the best of my knowledge, however, such methods have never been entirely satisfactory since they generally have an adverse effect upon the desirable properties of polycarbonate resins. Consequently, a means for reducing the environmental stress crazing and cracking of polycarbonate resins without appreciably affecting any of the desirable properties has heretofore not been available.

Unexpectedly, I have discovered that polycarbonate resins may be rendered more resistant to environmental stress crazing and cracking and that their heat distortion temperatures may be increased by incorporating therewith a polyarylene ether composed of the repeating structural unit

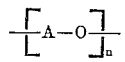

wherein A is an aromatic nucleus and $n$ is a positive integer.

The proportions of the ingredients employed in the practice of the present invention may be varied widely. Generally, I prefer to employ, on a weight basis, from about 5 to about 98 parts of the polycarbonate to 2 to 95 parts of the polyarylene ether. Preferably, the polyarylene ether may be added to the polycarbonate in amounts ranging from about 15% to about 85% of the total weight of the polyarylene ether and the polycarbonate resin. Such addition may be accomplished in any manner so long as a thorough distribution of the polyarylene ether in the polycarbonate resin is obtained. For example, the mixing of materials may be accomplished by a variety of methods normally employed for incorporation of plasticizers or fillers into thermoplastic polymers including but not limited to mixing rolls, dough-mixers, Banbury mixers, extruders, and other mixing equipment. The resulting mixtures may be handled in any conventional manner employed for the fabrication or manipulation of thermoplastic resins. The materials may be molded using compression, injection, calendering and extrusion techniques. Alternatively, the blending of the polycarbonate with the polyarylene ether may be accomplished by mixing solutions of the two resins which may thereafter be treated with a non-solvent to effect co-precipitation. The precipitated polymers may then be recovered in a dry state after filtration to remove the non-solvent and final evaporation of residual solvent. Dry blending of a mixture of the individual polymers followed by thermal fusion is a convenient means for producing a conventional molding compound. In this procedure the dry blend may be extruded and chopped into pellets for subsequent use in injection molding procedures. It should be understood that the polycarbonate resin-polyarylene ether mixtures of the invention may contain other additives to lubricate, prevent oxidation or lend color to the material. Such additives are well known in the art, and may be incorporated without departing from the scope of the invention.

In addition to exhibiting an increased resistance to environmental stress crazing and cracking, the improved polycarbonate-polyarylene ether resin mixtures of the invention exhibit a relatively high impact strength and an increased softening temperature as compared with unmodified polycarbonate resin materials. Moreover, the alkaline resistance of polycarbonate resins, by virtue of the incorporation of polyphenylene ethers, is greatly improved.

The fact that the addition of a polyarylene ether to a polycarbonate resin system provides a resinous mixture having an improved resistance to environmental stress crazing and cracking is totally unexpected and is not fully understood. For example, the polyarylene ethers used to provide the improved polycarbonate resin mixtures of the invention are themselves subject to crazing and cracking while under stress and in contact with organic solvents such as those mentioned above, and accordingly would not be expected to improve the environmental stress craze and crack resistance of other thermoplastic materials. In addition, the improvement realized in the tensile heat distortion temperature of a polycarbonate resin by the addition of a polyarylene ether polymer is greater than would be expected. For example, the addition of 50 parts by weight of polyarylene ether having a heat distortion temperature of 240° C. to 50 parts by weight of a polycarbonate resin having a heat distortion temperature of 150° C. would be expected to provide a mixture having a heat distortion temperature of about 195° C. However, such a mixture was found to have a tensile heat distortion temperature of about 217° C., or 22° higher than that predicted.

As stated above, the polyarylene ethers which are used to provide the polycarbonate resin mixtures of the invention may be composed of recurring units of the formula

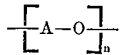

wherein A stands for an aryl radical, either substituted or unsubsituted and $n$ is a whole number equal to at least 10 or more, e.g., up to 1000 or more. Thus, A can be, for example, phenylene, chlorophenylene (e.g., from 1 to 4 nuclearly substituted chlorine atoms), naphthylene, and the tolylene radical. A group of aryl polymers which may be advantageously employed in the practice of the invention comprise those having recurring structural units of the general formula

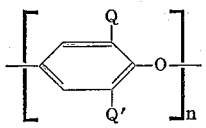

wherein the oxygen atom of one unit is connected to the benzene nucleus of the adjoining unit; $n$ is a positive integer equal, for instance, to at least 10 (e.g., from 100 to 5000 or more); Q is a monovalent substituent selected from the class consisting of hydrogen aliphatic hydrocarbon radicals free of a tertiary alpha-carbon atom (e.g., methyl, ethyl, propyl, isopropyl, butyl, etc. radicals), halogen (e.g., chlorine, bromine, fluorine), aralkyl, alkaryl, and aryl radicals, Q' is a monovalent substituent which may be the same as Q and in addition may be a hydrocarbonoxy radical free of an aliphatic tertiary alpha-carbon atom. Typical examples of monovalent hydrocarbonoxy radicals are, for instance, methoxy, ethoxy, propoxy, butoxy, phenoxy, ethylphenoxy and tolyloxy radicals.

These polyarlylene ethers may be prepared by a variety of different methods. One such method comprises oxidizing a phenol respresented by the formula

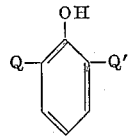

wherein Q and Q' have the meanings given above. These phenols are oxidized by passing an oxygen containing gas (for example, oxygen itself or air) through the particular phenol in the presence of a catalyst system comprising a cuprous salt and an amine. More specific directions for preparing these polyphenylene ethers as well as examples of starting materials and polymers prepared therefrom are disclosed and claimed in copending applications of A. S. Hay, Serial No. 212,128 filed July 24, 1962 and J. Kwiatek, Serial No. 744,087, filed June 24, 1958, now U.S. Patent 3,134,753, assigned to the same assignee as the present invention. By reference, these two applications are made part of the disclosure and teaching of the instant application in order to avoid undue prolixity in reciting the starting ingredients, the catalyst systems, the conditions, as well as the various radicals which the substituents in the above general formulas may represent.

Another group of polyarylene ethers which may be employed in the practice of the present invention are those for example having the general formula

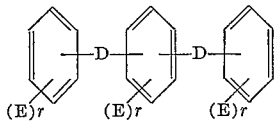

where D is a member selected from the class consisting of oxygen and isoproplyidine; each $r$ is 0 or a whole number from 1 to 3, and E is a tertiary butyl or alpha-cumyl group, at least one third of the E's being in the meta position. Specific directions for preparing these types of compositions may be found in Belgian Patent 573,694, issued December 8, 1958.

Still another group of polyarylene ether materials which may be used in the practice of the present invention are the meta-oriented polyphenoxylene homopolymers represented by the general formula

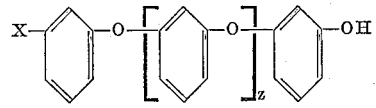

where X is a halogen atom and $z$ is an intergar generally of at least 10. Such meta oriented polyphenylene homopolymers may be prepared by self-condensation of an alkaline metal salt of a m-halogenophenol in the presence of a suitable copper catalyst under anhydrous conditions. More specific directions for preparing such polyphenoxylene homopolymers as well as examples of starting materials and polymers prepared therefrom are disclosed and claimed in the copending application of R. J. Blackinton and G. P. Brown, Serial No. 163,866 filed January 2, 1962, asigned to the same assignee as the present invention, which is hereby included by reference as part of this application.

The aromatic carbonate polymers used to provide the craze resistant mixtures of the present invention may be prepared by reacting a dihydric phenol with a carbonate precursor such as phosgene, a haloformate, or a carbonate ester. Generally speaking, such carbonate polymers may be typified as possessing recurring structural units of the formula

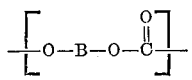

where B is a divalent aromatic radical of the dihydric phenol employed in the polymer producing reaction. The dihydric phenols which may be employed to provide such aromatic carbonate polymers are mononuclear or polynuclear aromatic compounds, containing as functional groups, 2 hydroxy radicals, each of which is attached directly to a carbon atom of an aromatic nucleus. Typical dihydric phenols are 2,2 bis-(4-hydroxyphenyl)-propane; hydroquinone; resorcinol; 2,2 bis-(4-hydroxyphenyl) - pentane; 2,4' dihydroxy diphenyl methane; bis-(2-hydroxyphenyl) methane; bis-(4-hydroxyphenyl)-methane; bis-(4-hydroxy 5 nitrophenyl)-methane; 1-1 bis-(4-hydroxyphenyl)-ethane; 3,3 bis-(4-hydroxyphenyl)-pentane; 2,2' dihydroxydiphenyl; 2,6 dihydroxy naphthalene; bis-(4-hydroxyphenyl) sulfone; 2,4' dihydroxydiphenyl sulfone; 5'-chloro-2,4' dihydroxydiphenyl sulfone; bis-(4-hydroxyphenyl) diphenyl disulfone; 4,4' dihydroxydiphenyl ether; 4,4' diphenyl ether; 4,4' dihydroxy 3,3' dichloro diphenyl ether; and 4,4' dihydroxy-2,5-diethoxydiphenyl ether. A variety of additional dihydric phenols which may be employed to provide such carbonate polymers are disclosed in U.S. Patent 2,999,835—Goldberg-assigned to the assignee of the present invention. It is, of course, possible to employ two or more different dihydric phenols, or a dihydric phenol in combination with a glycol, a hydroxy terminated polyester, or a dibasic acid in the event a carbonate copolymer rather than homopolymer is desired for use in the preparation of the polycarbonate mixture of the invention.

When a carbonate ester is used as the carbonate precursor in the polymer forming reaction, the materials are reacted at temperatures of from 100° C. or higher for times varying from 1 to 15 hours. Under such conditions ester interchange occurs between the carbonate ester and the dihydric phenol used. The ester interchange is advantageously consummated at reduced pressures of the order of from about 10 to about 100 mm. of mercury, preferably in an inert atmosphere, such as nitrogen or argon, for example.

Although the polymer forming reaction may be conducted in the absence of a catalyst, one may, if desired employ the usual ester exchange catalysts. such as, for example, metallic lithium, potassium, calcium and magnesium. Additional catalysts and variations in the exchange methods are discussed in Groggins, "Unit Processes in Organic Synthesis" (4th edition, McGraw-Hill Book Company, 1952), pages 616 to 620. The amount of such catalyst, if used, is usually small, ranging from about 0.001 to about 0.1%, based on the moles of the dihydric phenol employed.

The carbonate ester useful in this connection may be aliphatic or aromatic in nature, although aromatic esters, such as diphenyl carbonate, are preferred. Additional examples of carbonate esters which may be used are dimethyl carbonate, diethyl carbonate, phenylmethyl carbonate, phenyltolyl carbonate and di(totyl) carbonate.

A preferred method for preparing the carbonate polymers suitable for use in providing the craze resistant polycarbonate mixtures of the present invention involves the use of a carbonyl halide, such as phosgene, as the carbonate precursor. This method involves passing phosgene gas into a reaction mixture containing the dihydric phenol and an acid acceptor such as a tertiary amine (e.g., pyridine, dimethylanaline, quinoline etc.). The acid acceptor may be used undiluted or diluted with inert organic solvents as, for example, methylene chloride, chlorobenzene, or 1,2 dichloroethane. Tertiary amines are advantageous since they are good solvents as well as acid acceptors during the reaction.

The temperature at which the carbonyl halide reaction proceeds may vary from below 0° C. to above 100° C. The reaction proceeds satisfactorily at temperatures from room temperature (25° C.) to 50° C. Since the reaction is exothermic, the rate of phosgene addition may be used to control the temperature of the reaction temperature. The amount of phosgene required will generally depend upon the amount of dihydric phenol present. Generally speaking, one mole of phosgene will react with one mole of the dihydric phenol used to provide the polymer and two moles of HCl. Two moles of HCl are in turn "attached" by the acid acceptor present. The foregoing are herein referred to as stoichiometric or theoretical amounts.

Another method for preparing the carbonate polymers which may be used to provide the craze resistant polycarbonate resin mixtures of the invention comprises adding phosgene to an alkaline aqueous suspension of the dihydric phenol used. This is preferably done in the presence of inert solvents such as methylene chloride, 1,2 dichloro ethane and the like. Quatenary ammonium compounds may be employed to catalyze the reaction.

A third method for preparing such carbonate polymers involves the phosgenation of an agitated suspension of the anhydrous alkali salts of the dihydric phenol used in a non-aqueous medium such as benzene, chlorobenzene, and toluene. This reaction is illustrated by the addition of phosgene to a slurry of the sodium salt of 2,2 bis-(4-hydroxyphenyl) propane in an inert polymer solvent such as chlorobenzene. The organic solvent should preferably be a polymer solvent but need not necessarily be a good solvent for the reactants.

Generally speaking, a haloformate such as the bishaloformate of 2,2 bis-(4-hydroxyphenyl) propane may be substituted for phosgene as the carbonate precursor in any of the methods described above.

In each of the above solution methods of preparation, the carbonate polymer emerges from the reaction in either a true or pseudo solution whether aqueous base or pyridine is used as an acid acceptor. The polymer may be precipitated from the solution by adding a polymer non-solvent, such as heptane or isopropanol. Alternatively, the polymer solution may be heated to evaporate the solvent.

A preferred method of preparing the polycarbonate resins useful in the practice of the invention comprises passing a carbonyl halide, such as phosgene, into a slurry comprising a suspension of solid particles in a single liquid phase, the suspension of solid particles comprising a dihydric phenol and at least two moles, per mole of dihydric phenol, of at least one acid acceptor selected from the group consisting of a hydroxide, a carbonate and a phosphate of an alkali or an alkaline earth metal, and the single liquid phase comprising an inert organic liquid which is a solvent for the carbonate polymer, but a non-solvent for the dihydric phenol and the acid acceptor, to form a reaction mixture having a solid phase and a single liquid phase comprising a solution of the carbonate polymer in the inert organic liquid, and separating the liquid phase from the solid phase. Such a method for preparing a polycarbonate resin is disclosed and claimed in the copending application of H. E. Munro, Serial No. 178,254 filed March 8, 1962, assigned to the same assignee as this invention, which is hereby included by reference as a part of this application.

In order that those skilled in the art may better understand how the present invention may be practiced, the following examples are given by way of illustration and not by way of limitation. All parts and percentages are by weight unless otherwise indicated.

EXAMPLE 1

This example illustrates the preparation of a polyarylene ether polymer of the type used to prepare the polycarbonate resin mixtures of the invention.

Oxygen gas was passed for a period of 75 minutes into a reaction vessel containing 20 parts 2,6-dimethylphenol, 0.14 part cuprous chloride, about 19.8 parts benzene and 23 parts pyridine. The temperature of the reaction mixture was held to a maximum of 40° C. during the course of the reaction. After the reaction was completed, the mixture was diluted with 616 parts of benzene and the product precipitated by pouring the reaction mixture into about 2014 parts methanol containing about 8 parts HCl, and the polymer subsequently separated by filtration. The product poly-(2,6-dimethyl-1,4-phenylene) ether was characterized by the recurring structural unit of the formula

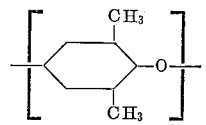

This product, hereafter referred to as "phenylene ether polymer" had a melting point in excess of 240° C., an intrinsic viscosity of about 0.6 deciliter per gram, and a molecular weight of about 20,000–25,000. It was soluble in solvents such as, for example, benzene, tolulene, xylene, and chloroform.

EXAMPLE 2

The following example illustrates the preparation of a polycarbonate resin of the type which may be employed to provide the craze resistant resin mixtures of the invention.

A slurry was prepared by stirring the following materials in a reaction vessel: 114 parts of 2,2-bis-(4-hydroxyphenyl) propane, 129.6 parts calcium hydroxide, and 760 parts methylene chloride.

The slurry was heated to about 40° C. at which time heating was discontinued. Phosgene was then added to the stuffed slurry at a rate of about 0.82 part per minute for about 55 minutes and thereafter at 0.08 part per minute for an additional 90 minutes. The heat generated by the reaction maintained the slurry at a temperature of 38–40°, i.e., the reflux temperature of the methylene chloride. After the reaction had subsided, air was blown through the reaction mixture to cool it and free it of any excess phosgene. The cooled slurry was then diluted with methylene chloride, centrifuged, and the solid phase removed. The single liquid phase obtained, consisting of a solution of the carbonate polymer in the methylene chloride, was filtered, and the carbonate polymer precipitated by adding heptane to the solution. The polymer was separated from the mixture by filtration and was dried at 125° C. The intrinsic viscosity measured in dioxane 30° C. of the polymer thus obtained was 0.54, which corresponds to a molecular weight of about 35,000 (weight average).

EXAMPLE 3

One part of a phenylene ether polymer of the type prepared in Example 1 and 2 parts by weight of the polycarbonate of the type prepared in Example 2 were placed in a mixing vessel and sufficient chloroform was added to provide a 20 percent solution of the two polymers in the chloroform solvent. The resulting solution was cast on a glass plate to yield a film having a thickness of 4–5 mils after drying to effect solvent removal. The film thus obtained was transparent, flexible and tough. This film was then cut into strips and examined for solvent stress cracking by creasing the film followed by immersion in acetone and by creasing the film after immersion in acetone. In both cases the film became white in appearance at the folded area. The creased films were then removed from the solvent, dried and repeatedly folded and unfolded at the crease line. The samples maintained integrity throughout these tests.

A film prepared by casting a solution of poly-(2,2 diphenyl propane)-carbonate of similar thickness was subjected to the same test as described above. The sample of the unmodified polycarbonate film shattered immediately at the point of stress when wet with acetone.

A 4–5 mil thick film prepared by solution casting a chloroform solution of phenylene ether polymer was subjected to the same tests as indicated above. As in the case of the unmodified polycarbonate film, the phenylene ether film cracked when strained and immersed in the acetone solution.

EXAMPLE 4

A 1:1 powder blend of phenylene ether polymer and poly-(2,2 diphenyl propane)-carbonate was prepared by mixing the powdered polymers in a Waring blendor. The powder blend was then compacted with pressure and fed into a melt viscometer. The blend was fused and repeatedly forced back and forth through an orifice over a 30 minute period while being held at a temperature of about 315° C. The final product was extruded to yield a tough, homogeneous product.

EXAMPLE 5

A portion of the powder blend from Example 4 was thermally fused and extruded as a rod (⅛" diameter) from a melt indexer. The rod was then bent into a loop approximately one inch in diameter. When this loop was immersed in acetone the only apparent change detected was a slight whitening of the surface. After drying, the whitened area was removed by abrasion and was found to have penetrated only to the extent of a few mils.

A similar experiment with an unmodified poly-(2,2 diphenyl propane) carbonate rod resulted in an almost explosive stress cracking.

EXAMPLE 6

In order further to demonstrate the improved properties exhibited by the polycarbonate resin mixtures prepared in accordance with the invention, chloroform solutions of phenylene ether polymer and poly-(2,2 diphenyl propane)-carbonate resin were prepared. The solutions were then blended to yield respectively 25:75; 50:50 and 75:25 phenylene ether polymer-polycarbonate resin concentrations. Films were then cast from all of the solutions as well as the solutions containing the pure phenylene ether polymer and the pure polycarbonate resin. All of the films prepared from the polymer blends exhibited some whitening at stress points when immersed in acetone but none of thses samples cracked. On the other hand, the films prepared from the unmodified phenylene ether polymers and the unmodified polycarbonate resins shattered immediately at the point of stress when wet with acetone.

Room temperature tensile strengths and related physical properties of the films prepared from the respective phenylene ether-polycarbonate blends were then measured. It was discovered that there was no significant departure from the properties of the pure polymer materials, namely, tensile strengths between 8000 and 9500 p.s.i. and tensile moduli between 225,000 and 265,000.

The tensile heat distortion temperatures of the films thus prepared were then measured using standard ASTM procedures. The results obtained, shown in Table I below, were found to be totally unexpected since the addition of small quantities of the phenylene ether polymer to the polycarbonate resin had a significantly greater effect on the tensile heat distortion temperature than would be expected based on an arithmetic average.

*Table I*

| Percent polycarbonate | Percent phenylene oxide polymer | Heat distortion temperature, ° C. | |
|---|---|---|---|
| | | Of sample tested | Expected |
| 0 | 100 | 240 | 240 |
| 25 | 75 | 230 | 218 |
| 50 | 50 | 217 | 195 |
| 75 | 25 | 187 | 172 |
| 100 | 0 | 150 | 150 |

By virtue of the present invention, there are provided a new class of polycarbonate resin mixtures having improved resistance to environmental stress crazing and cracking. Such resinous mixtures may be used in molding powder formulations either alone or in combination with fillers, such as, for example, wood flour, diatomaceous earth, silica and carbon black, to make molded parts of various shapes. They are useful in preparing gaskets, tubing and other materials which have an improved resistance to crazing and cracking when in contact with organic cleansing solvents or lubricants such as acetone, heptane or carbon tetrachloride.

In addition to the completely unexpected improvements in stress cracking resistance, the addition of small proportions of phenylene oxide polymers to the polycarbonate resins results in relatively large increases in the heat distortion temperature of the blend. From a practical standpoint, this allows the use of polycarbonate resins in applications where their general properties are particularly well suited and at the same time permit occasional operation at high temperatures where the polycarbonate resins alone would normally fail by heat distortion.

Films of the improved polycarbonate resin mixtures of the invention are useful as wrapping or packaging materials, as metal or fiber liners, containers, covers, closures, electrical insulating tapes, sound recording tapes, and pipe coverings.

Films and fibers of the material may be beneficially oriented or drawn at elevated temperatures such as from 50° C. to 250° C. Fibers of the material may be used for yarn, thread, bristles and rope, for example, and are readily dyed.

Because of their improved craze resistant properties, the polycarbonate resin mixtures of the present invention may be used as surface coverings for appliances, or as coatings for rods and wire, as slot insulation in dynamo electric machines and as bonding materials for parts for laminates as well as in adhesive formulations. They are also efficacious as wire enamels and may be readily admixed with pigments, stabilizers, and plasticizers. The compositions of the invention may also be admixed with other resinous materials.

The addition of at least one polymer selected from the class consisting of polyethylene, polypropylene, polyisobutylene, polystyrene, a copolymer of ethylene and alkyl acrylate, a copolymer of ethylene and propylene, and cellulose acetate butyrate, in certain proportions to polycarbonate resins to provide resinous mixtures having improved craze resistant properties is described and claimed in copending application Serial No. 209,215 filed concurrently herewith, and assigned to the same assignee as the present invention (now abandoned).

What I claim as new and desire to secure by Letters Patent of the United States is:

1. A resin mixture comprising (1) an aromatic carbonate polymer of a dihydric phenol and (2) a polyarylene ether composed of the repeating structural unit

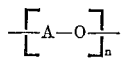

wherein A is a monocyclic aromatic radical and $n$ is a positive integer equal to at least 10.

2. A resin mixture comprising (1) an aromatic carbonate polymer of a dihydric phenol and (2) a polyarylene ether composed of the repeating structural unit

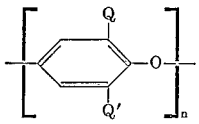

wherein the oxygen atom of one unit is connected to the benzene nucleus of the adjoining unit, $n$ is a positive integer equal to at least 10, Q is a monovalent substituent selected from the class consisting of aliphatic hydrocarbon radicals free of a tertiary alpha-carbon atom, and Q' is the same as Q.

3. A resin mixture comprising (1) an aromatic carbonate polymer of a dihydric phenol and (2) a polyarylene ether composed of the repeating structural unit of the formula

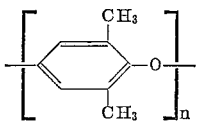

wherein $n$ is a positive integer equal to at least 10.

4. A resin mixture comprising: (1) an aromatic polycarbonate resin composed of recurring structural units of the formula

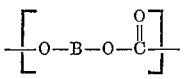

wherein B is an aromatic radical; and (2) a polyarylene ether composed of the repeating structural unit

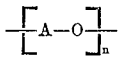

wherein A is a monocyclic aromatic radical and $n$ is a positive integer equal to at least 10.

5. A resin mixture comprising (1) poly (2,2 diphenyl propane) carbonate and (2) a polyarylene ether composed of the repeating structural unit

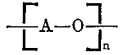

wherein A is a monocyclic aromatic radical and $n$ is a positive integer equal to at least 10.

6. A resin mixture comprising: (1) an aromatic polycarbonate resin having recurring structural units of the formula

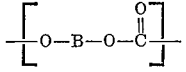

where B is an aromatic radical; and (2) a polyarylene ether composed of the repeating structural unit

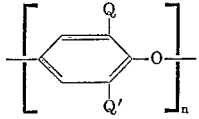

wherein the oxygen atom of one unit is connected to the benzene nucleus of the adjoining unit, $n$ is a positive integer equal to at least 10, Q is a monovalent substituent selected from the class consisting of aliphatic hydrocarbon radicals free of a tertiary alpha-carbon atom, and Q' is the same as Q.

7. A resin mixture comprising (1) an aromatic polycarbonate resin having recurring structural units of the formula

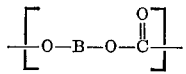

wherein B is an aromatic radical; and (2) a polyarylene ether composed of the repeating structural unit

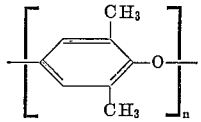

wherein $n$ is a positive integer equal to at least 10.

8. A resin mixture comprising (1) poly (2,2 diphenyl propane) carbonate and (2) a polyarylene ether composed of the repeating structural unit

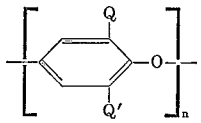

wherein the oxygen atom of one unit is connected to the benzene nucleus of the adjoining unit, $n$ is a positive integer equal to at least 10, Q is a monovalent substituent selected from the class consisting of aliphatic hydrocarbon radicals free of a tertiary alpha-carbon atom, and Q' is the same as Q.

9. A resin mixture comprising (1) poly (2,2 diphenyl propane) carbonate and (2) a polyphenylene ether composed of the repeating structural unit

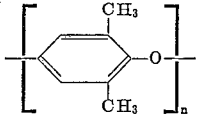

wherein $n$ is a positive integer equal to at least 10.

10. A film of a resin mixture comprising (1) an aromatic carbonate polymer of a dihydric phenol and (2) a polyarylene ether composed of the repeating structural unit

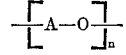

wherein A is a monocyclic aromatic nucleus and $n$ is a positive integer equal to at least 10.

11. An electrical conductor coated with an insulating material comprising a resin mixture comprising (1) an aromatic carbonate polymer of a dihydric phenol and (2) a polyarylene ether composed of the repeating structural unit

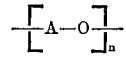

wherein A is a monocyclic aromatic nucleus and $n$ is a positive integer equal to at least 10.

12. A molded structure of a resin mixture comprising (1) an aromatic carbonate polymer of a dihydric phenol and (2) a polyarylene composed of the repeating structural unit

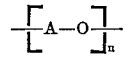

wherein A is a monocyclic aromatic nucleus and $n$ is a positive integer equal to at least 10.

References Cited by the Examiner

UNITED STATES PATENTS

| | | | |
|---|---|---|---|
| 2,789,968 | 4/1957 | Reynolds et al. | 260—77.5 |
| 3,080,342 | 3/1963 | Lee et al. | 260—77.5 |

LEON J. BERCOVITZ, *Primary Examiner.*

DONALD E. CZAJA, *Examiner.*